Patented June 21, 1938

2,121,330

UNITED STATES PATENT OFFICE 2,121,330

BENZENE DERIVATIVES CONTAINING HALOGENATED METHYL GROUPS AND PROCESS OF PREPARING THEM

Otto Scherer, Willy Schumacher, and Fritz Müller, Frankfort-on-the-Main, Germany, assignors to General Aniline Works, Inc., New York, N. Y., a corporation of Delaware No Drawing. Application October 20, 1936, Serial No. 106,694. In Germany October 25, 1935

7 Claims. (Cl. 260—160)

The present invention relates to benzene derivatives containing halogenated methyl groups and to a process of preparing them, more particularly it relates to compounds corresponding with the following general formula:

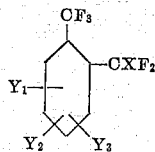

wherein X stands for hydrogen, chlorine or fluorine, $Y_1$ and $Y_2$ stand for hydrogen, halogen or the trifluoromethyl group and $Y_3$ stands for hydrogen or halogen.

In the exhaustive side-chain chlorination of benzene derivatives containing in the nucleus more than one methyl group, such as, for instance, meta-xylene or para-xylene, mesitylene or a substitution product or derivative thereof, for instance, according to the process of French Patent 798,727, it is easily possible to exchange all the hydrogen atoms in the side-chains for chlorine with formation of meta- or para-xylenehexachloride, mesitylene-nonachloride and so on. By using, however, in this reaction benzene derivatives which contain two methyl groups in ortho-position to one another as, for instance, ortho-xylene or pseudocumene, the absorption of chlorine is finished when all three hydrogen atoms of the one methyl group and two hydrogen atoms of the other methyl group in ortho-position have been exchanged for chlorine; it is not possible to exchange for chlorine the remaining hydrogen atom of the second methyl group in ortho-position and to obtain, for instance, the ortho-xylene-hexachloride or pseudo-cumene-nonachloride. Consequently, there cannot be made, according to this method, derivatives of orthoxylene, or substitution products thereof, which are entirely halogenated in the side chains.

We have found that benzene derivatives containing two trihalogenmethyl groups in ortho-position are obtainable by first pentachlorinating the two methyl groups, in ortho-position, of ortho-dimethylbenzenes and exchanging then the chlorine for fluorine by one of the known methods, for instance by the process of German Patent 575,593. Thereby an ortho-trifluoromethyl-benzalfluoride of the following formula is obtained:

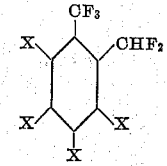

wherein X stands for hydrogen or a substituent. It is surprising that in this compound the remaining hydrogen atom of the side chain can be exchanged for chlorine so that a benzene derivative entirely halogenated in both methyl groups in ortho-position and corresponding with the following formula:

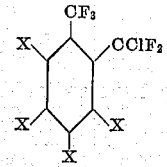

wherein X stands for hydrogen or a substituent is obtained.

In the 1-trifluoromethyl-2-difluorochloromethylbenzenes thus formed the chlorine in the side-chain may be exchanged for fluorine with formation of derivatives of ortho-xylene, or substitution products thereof in which all the hydrogen atoms of the methyl groups in ortho-position are exchanged for fluorine.

The new compounds are valuable parent materials, for instance, for the manufacture of dyestuffs or fungicides and/or insecticides.

The following examples serve to illustrate the invention, but they are not intended to limit it thereto.

(1) Ortho-xylene is chlorinated, for instance by the process of French Patent 798,727. After absorption of 5 chlorine atoms, the chlorination is at an end. The ortho-xylene-penta-chloride is obtained in a nearly quantitative yield; it forms a white crystalline mass melting at 48° C. It is treated, for instance, according to the statements of German Patent 575,593, with anhydrous hydrogen fluoride, whereby the ortho-xylenepentafluoride is obtained. The latter forms a liquid which is clear as water and boils at 140–142° C. under ordinary pressure.

The ortho-xylenepentafluoride is further chlorinated and there is obtained with a very good yield the 1-trifluoromethyl-2-difluorochloromethylbenzene which forms a liquid clear as water and boils at 168–170° C. under ordinary pressure.

In the compound thus formed the chlorine may be exchanged for fluorine with formation of orthoxylenehexafluoride which forms a colorless liquid boiling at 140–142° C. under ordinary pressure.

In a quite similar manner there may be obtained from 4-chloro-ortho-xylene by way of 4-chloro-1-trichloromethyl-2-benzalchloride and 4-chloro-1-trifluoromethyl-2-benzalfluoride (colorless liquid boiling at 164–167° C. under ordinary pressure) the 4-chloro-1-trifluoromethyl-2-difluorochloromethylbenzene (colorless liquid boiling at 74–77° C. under a pressure of 18 mm.) and the 4-chloro-1.2-xylenehexafluoride which is a colorless liquid boiling at 160–164° C. under ordinary pressure. From dichloro-ortho-xylene there are obtained the corresponding compounds which are twice chlorinated in the nucleus.

(2) In the manner described in Example 1 there is obtained from pseudocumene first the pseudocumene-octachloride, probably of the formula:

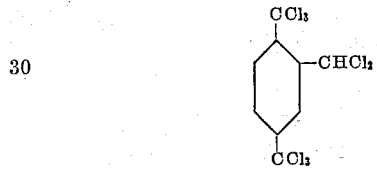

a white crystalline body melting at 70° C., and from this product the pseudocumene-octafluoride, probably of the formula:

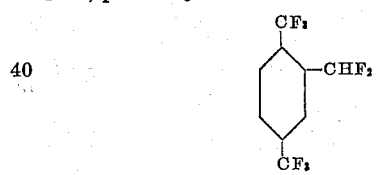

which forms a colorless liquid boiling under ordinary pressure at 140–143° C. By chlorinating this compound there is obtained the bis-trifluoro-methyl-difluoro-chloromethylbenzene, probably of the formula:

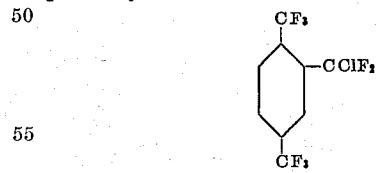

forming a colorless liquid boiling under ordinary pressure at 160–163° C. By exchanging in the latter compound chlorine for fluorine the pseudocumene-nonafluoride, probably of the formula:

is obtained, forming a colorless liquid boiling at 140–143° C. under ordinary pressure.

In quite a similar manner there are obtained from chloro- and di-chloro-pseudocumene the corresponding products which are halogenated in the nucleus. From durene there is obtained by way of durene-decachloride the durene-decafluoride, from this body the bis-trifluoromethyl-bis-difluorochloromethylbenzene and from the latter the durene-dodecafluoride.

We claim:
1. The process which comprises pentachlorinating the two methyl groups, in ortho-position, of ortho-dimethylbenzenes, exchanging then the chlorine for fluorine and replacing the remaining hydrogen atom of the side chain by chlorine.
2. The process which comprises pentachlorinating the two methyl groups, in ortho-position, of ortho-dimethylbenzenes, exchanging then the chlorine for fluorine, replacing the remaining hydrogen atom of the side chain by chlorine and exchanging in the ortho-trifluoromethyl-difluoro-chloromethylbenzenes thus obtained the chlorine in the side chain for fluorine.
3. The compounds of the following general formula:

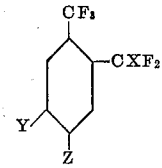

where X is one of the group consisting of hydrogen, chlorine and fluorine, Y is one of the group consisting of hydrogen, chlorine and $CXF_2$ and Z is one of the group consisting of hydrogen, chlorine and $CF_3$.
4. The compounds of the following general formula:

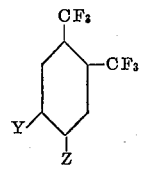

where Y and Z stand for members of the group consisting of hydrogen, chlorine and $CF_3$.
5. The compound of the following formula:

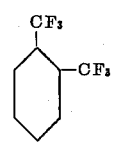

being a colorless liquid which boils at 140–142° C. under ordinary pressure.
6. The compound of the following formula:

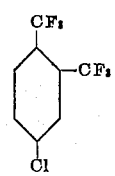

being a colorless liquid which boils at 160–164° C. under ordinary pressure.
7. The compound of the following formula:

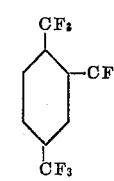

being a colorless liquid which boils at 140–143° C. under ordinary pressure.

OTTO SCHERER.
WILLY SCHUMACHER.
FRITZ MÜLLER.